(12) United States Patent
Hedrick (10) Patent No.: US 7,600,351 B2
(45) Date of Patent: *Oct. 13, 2009

(54) TRANSFER TERMINAL WITH SURGE BIN

(75) Inventor: Thomas W. Hedrick, Sikeston, MO (US)

(73) Assignee: Phillip Barry South, Menan, ID (US)

( * ) Notice: Subject to any disclaimer, the term of this patent is extended or adjusted under 35 U.S.C. 154(b) by 390 days.

This patent is subject to a terminal disclaimer.

(21) Appl. No.: 10/650,951

(22) Filed: Aug. 28, 2003

(65) Prior Publication Data

US 2004/0042881 A1 Mar. 4, 2004

Related U.S. Application Data

(60) Provisional application No. 60/407,816, filed on Sep. 3, 2002.

(51) Int. Cl.
*B65G 65/42* (2006.01)

(52) U.S. Cl. .......................... 52/192; 414/133; 414/328

(58) Field of Classification Search ................. 414/133, 414/29, 328; 222/56, 58, 64, 61; 52/192, 52/197
See application file for complete search history.

(56) References Cited

U.S. PATENT DOCUMENTS

| | | | |
|---|---|---|---|
| 883,764 A | 4/1908 | Volans | |
| 1,050,022 A | 1/1913 | Hindmarsh | |
| 1,050,953 A | 1/1913 | Kint | |
| 1,052,946 A * | 2/1913 | Otis | 209/355 |
| 1,576,940 A * | 3/1926 | Warner | 52/194 |
| 1,758,662 A | 5/1930 | Heath | |
| 2,500,043 A | 3/1950 | Radtke | |
| 2,801,137 A | 7/1957 | Clay | |
| 3,073,018 A | 1/1963 | Gauthron | |
| 3,092,264 A | 6/1963 | Milek | |
| 3,319,807 A * | 5/1967 | Van Raden | 414/269 |
| 3,358,856 A * | 12/1967 | Weibull | 414/298 |
| 3,513,995 A | 5/1970 | Stroker | |
| 3,526,328 A | 9/1970 | Garrett et al. | |
| 3,655,245 A | 4/1972 | Schumacher | |
| 3,847,289 A | 11/1974 | Fischer | |
| 4,038,795 A | 8/1977 | Abrams | |
| 4,078,703 A * | 3/1978 | Dressler | 406/91 |
| 4,324,074 A | 4/1982 | South et al. | |
| 4,412,561 A | 11/1983 | Sakaguchi et al. | |
| 4,462,744 A | 7/1984 | Rasilainen et al. | |
| 4,645,403 A | 2/1987 | DeWit | |
| 4,721,425 A | 1/1988 | Strocker | |

(Continued)

FOREIGN PATENT DOCUMENTS

EP 0 046 454 A1 2/1982

*Primary Examiner*—Charles A Fox
(74) *Attorney, Agent, or Firm*—Workman Nydegger (57) ABSTRACT

A transfer terminal includes a storage structure bounding a chamber, the chamber being adapted to receive bulk material. A surge bin is at least partially disposed within the chamber of the storage structure. The surge bin receives the bulk material for dispensing. In one embodiment, for a portion of the bulk material that cannot freely flow into the surge bin, mechanical structures are provided for transferring the bulk material into the surge bin. A passageway extends through or below at least a portion of the storage structure. The first surge bin is in communication with the passageway for delivering the bulk material thereto.

36 Claims, 10 Drawing Sheets

U.S. PATENT DOCUMENTS

| | | | |
|---|---|---|---|
| 4,775,278 A | 10/1988 | Fischer et al. | |
| 4,885,880 A | 12/1989 | Sudrabin et al. | |
| 4,930,943 A * | 6/1990 | Ahrens et al. | 406/90 |
| 5,098,247 A | 3/1992 | Campbell | |
| 5,149,229 A * | 9/1992 | Gericke et al. | 406/75 |
| 5,180,272 A | 1/1993 | Campbell | |
| 5,241,797 A | 9/1993 | Cliff | |
| 5,449,263 A | 9/1995 | Campbell et al. | |
| 5,944,168 A | 8/1999 | Campbell et al. | |
| 5,957,331 A * | 9/1999 | Minor et al. | 222/56 |
| 6,095,742 A | 8/2000 | Campbell | |
| 6,203,261 B1 | 3/2001 | South et al. | |
| 6,238,145 B1 * | 5/2001 | Paul et al. | 406/123 |
| 6,250,793 B1 * | 6/2001 | Gian | 366/131 |
| 6,354,465 B2 * | 3/2002 | Bell et al. | 222/58 |
| 6,503,041 B2 | 1/2003 | Van Gorp | |
| 6,540,089 B2 * | 4/2003 | Brock et al. | 209/316 |
| 6,931,801 B2 * | 8/2005 | Hedrick | 52/197 |
| 7,127,854 B2 * | 10/2006 | Hedrick | 52/192 |

* cited by examiner

TRANSFER TERMINAL WITH SURGE BIN

CROSS-REFERENCE TO RELATED APPLICATIONS

This application claims priority to U.S. Provisional Patent Application Ser. No. 60/407,816, filed Sep. 3, 2002, which is incorporated herein by specific reference.

BACKGROUND OF THE INVENTION

1. The Field of the Invention

The present invention relates to storage structures. More particularly, the present invention relates to storage structures configured to store bulk materials and systems and methods for dispensing the bulk materials therefrom.

2. The Relevant Technology

Dome shaped storage facilities have been used for many years to store bulk materials prior to transport for end use. Bulk materials generally include grains, legumes, salt, cement, and other granulated or powdered flowable materials. For practical reasons, domed storage facilities are typically built at ground level (as opposed to being elevated). As a result, a majority of bulk material is located at or close to ground level.

Conventional domed storage facilities operate by feeding the bulk material into the storage facility through an opening formed at the top. An outlet is centrally formed on the floor of the storage facility. When the storage facility is full, the bulk material flows out the opening under the force of gravity. As the storage facility empties, augers or other conventional conveyors within the storage facility are used to drag the bulk material from around the sides to the central opening.

The bulk material is typically dispensed into a transport vehicle, such as a truck or train, by use of an external transfer facility. That is, a conveyor belt is disposed below the opening of the storage facility so as to carry the bulk material away from the storage facility. Outside of the storage facility, the conveyor belt slopes upwardly so as to feed the bulk material into an elevated hopper of the transfer facility. The transport vehicle then pulls up either next to or below the hopper. The hopper is then selectively opened so that the bulk material dispenses out under gravitational force into the transport vehicle.

The above conventional process for dispensing bulk materials from dome shaped storage facilities has several shortcomings. For example, the use of the conveyor equipment to transport the bulk material from the storage facility to the external hopper adds increased expense and maintenance. For example, there is not only the cost of the conveyor equipment but also the cost for related foundations and support structures. In addition, each separate transport point requires the presence of a dust collection system and related maintenance.

Furthermore, some bulk material storage facilities are not energy efficient in that they require all of the bulk material to be elevated twice: once to get the bulk material into the storage facility and once to get the bulk material from the storage facility to the transfer facility. As a result, such systems are not energy efficient.

BRIEF DESCRIPTION OF THE DRAWINGS

Various embodiments of the present invention will now be discussed with reference to the appended drawings. It is appreciated that these drawings depict only typical embodiments of the invention and are therefore not to be considered limiting of its scope.

DETAILED DESCRIPTION OF THE PREFERRED EMBODIMENTS

One embodiment of the present invention relates to storage structures having a passageway formed therethrough or thereunder for allowing a transport vehicle to be positioned directly under the storage structure. In this configuration, the potential energy of the bulk material elevated within the storage structure is used to directly dispense the bulk material from the storage structure into the transport vehicle. As such, the system is more energy efficient. In addition, the system is more economical in that it no longer requires the extensive conveyor system and related support systems.

Figure 1:
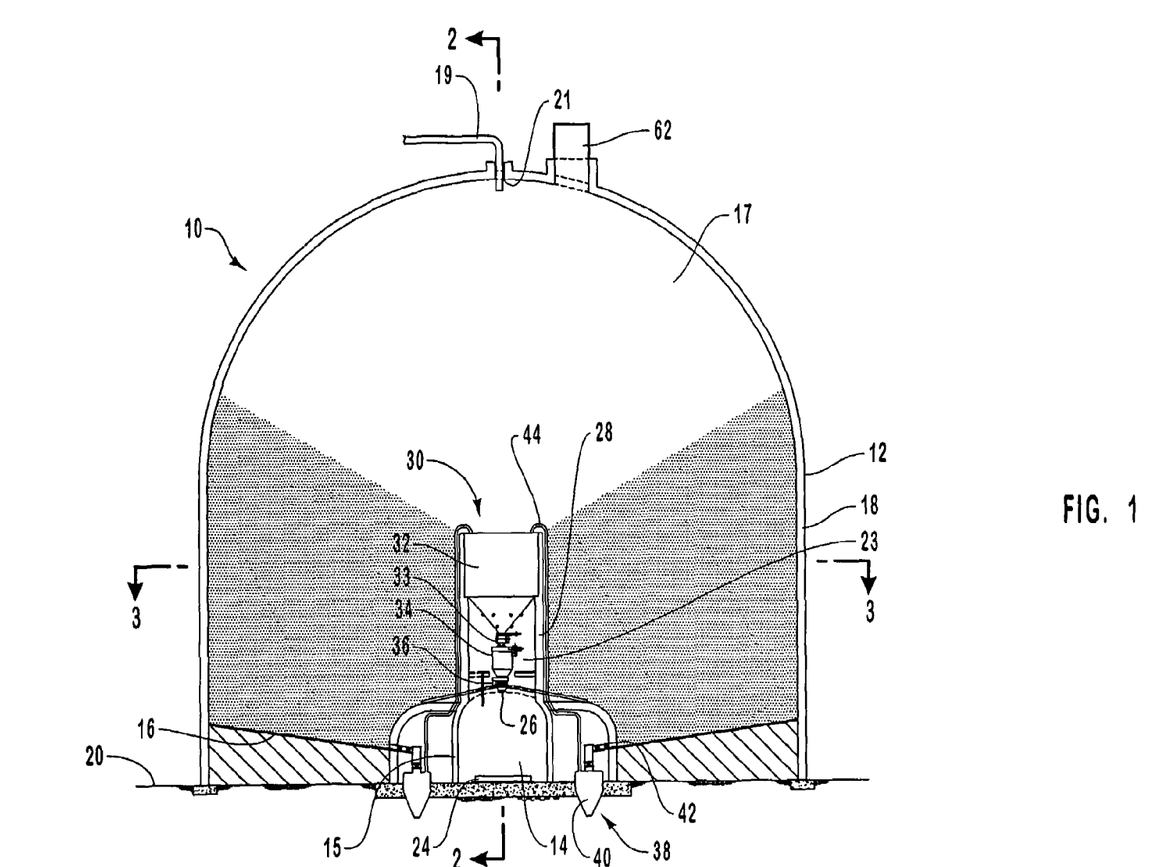
FIG. 1 illustrates a front cross-sectional view of one embodiment of a storage structure of the present invention.
Figure 2:
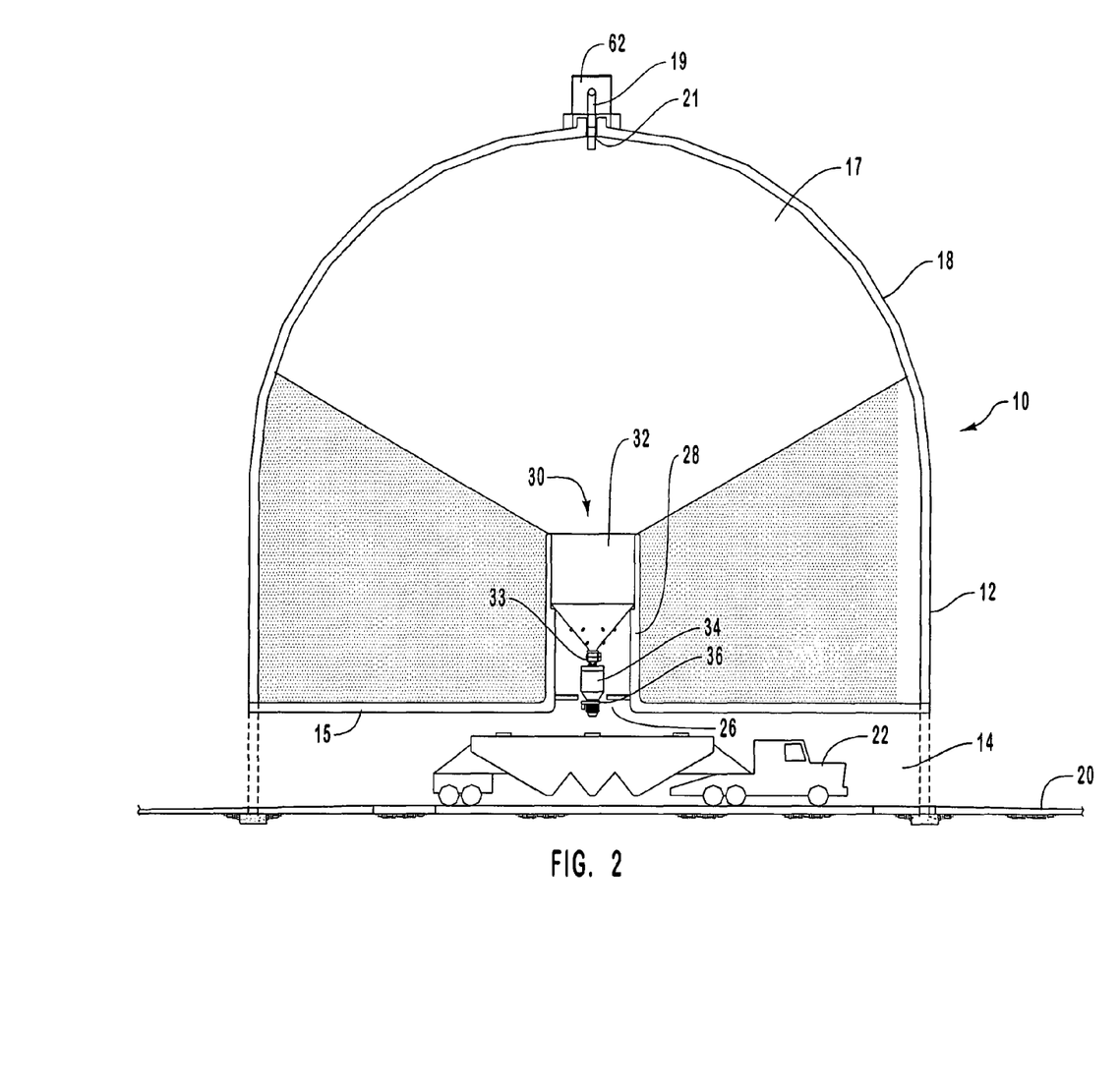
FIG. 2 illustrates a side cross-sectional view of the embodiment of FIG. 1.

Depicted in FIGS. 1 and 2 is one embodiment of a transfer terminal 10 incorporating features of the present invention. Transfer terminal 10 comprises a storage structure 12 and a passageway 14, in the form of a tunnel, transversely extending through storage structure 12. In the embodiment of FIG. 1, storage structure 12 comprises a substantially dome structure having a floor 16 and a singular substantially dome-shaped boundary wall 18. More specifically, boundary wall 18 comprises a free standing vertical wall with a domed shaped upper portion. One method for constructing storage structure 12 is described in U.S. Pat. No. 4,324,074 which is incorporated herein by specific reference. It is appreciated that substantially dome-shaped storage structure 12 shown in FIG. 1 is exemplary of the types of storage structures that may be employed in the present invention and that the storage structures are not limited to a dome-shaped structure. Other alternative shapes for storage structures contemplated by the present invention are square, rectangular, cylindrical, and the like. Although the storage structure can be any size, by way of example the chamber of storage structure 12 can have a volume greater than 1,000 cubic meters, greater than 50,000 cubic meters, or greater than 100,000 cubic meters.

Boundary wall 18 and floor 16 bound an chamber 17 configured to store bulk material. As used in the specification and appended claims, the term "bulk material" is intended to include grains, legumes, salt, cement, sand, rock aggregate, fly ash, fertilizer, and other granulated or powdered flowable food and non-food materials. An aperture 21 centrally extends through the top of boundary wall 18 so as to communicate with chamber 17. A fill line 19 extends through aperture 21. Fill line 19 is connected to a bucket elevator or other conveyor system in order to fill chamber 17 with the bulk material. A dust collector 62 may be provided on a top portion of boundary wall 18 to collect dust from the bulk material as it is fed into chamber 17. Other conventional forms of feeding bulk material into chamber 17 can also be used.

Passageway 14 is bounded by a tunnel wall 15 that extends through chamber 17. A dispensing aperture 26 centrally extends through the top of tunnel wall 15 so as to communicate with passageway 14. A substantially cylindrical wall 28 upwardly extends from tunnel wall 15 so as to encircle aperture 26. Wall 28 bounds a compartment 23. Disposed within compartment 23 and connected to wall 28 is a hopper assembly 30. Hopper assembly 30 comprises a surge bin 32, a flow control valve 33, a dust collector 34, and a loading spout 36. Surge bin 32 is secured to wall 28 such that bulk material is not able to leak between surge bin 32 and wall 28. Surge bin 32 and wall 28 can be made of concrete, steel, and/or any other materials having the desired strength and wear properties.

As shown in FIG. 1, the bulk material stored within storage structure 12 above hopper assembly 30 freely flows under gravitational force into surge bin 32. The size and type of hopper assembly 30 depends upon the type and size of bulk material stored in storage structure 12. In one embodiment of the invention, hopper assembly 30 dispenses bulk material at a rate of 100-400 tons per hour. Although surge bin 32 can be any desired size, in one embodiment surge bin 32 has a volume greater than 5 cubic meters, greater than 40 cubic meters, or greater than 90 cubic meters. It will be appreciated that wall 28 is exemplary of a structure for securing hopper assembly 30 above dispensing aperture 26 and that other structures may be employed for performing the same function.

As depicted in FIGS. 1 and 2, passageway 14 is configured such that a large transport vehicle 22 (FIG. 2) can drive therethrough. The transport vehicle can be any form of truck, rail cart, or other type if vehicle. As such, passageway 14 has a height with sufficient clearance for transport vehicle 22. As shown in FIG. 1, passageway 14 is formed on ground 20 and extends above floor 16 of storage structure 12. As passageway 14 extends the entire width of storage structure 12, transport vehicle 22 can thus drive straight through passageway 14, be loaded with bulk material through hopper assembly 30, and exit the other side of storage structure 12. As also shown in FIG. 1, the width of passageway 14 is formed with sufficient clearance for transport vehicle 22. In alternative embodiments, passageway 14 can be significantly wider to allow two or more transport vehicles to pass through side-by-side.

Dispensing aperture 26 is formed over passageway 14 so that transport vehicle 22 can be moved directly underneath dispensing aperture 26. Preferably, dispensing aperture 26 is positioned substantially centrally within storage structure 12 to promote the most efficient discharge of the bulk material from storage structure 12. However, it will be appreciated that dispensing aperture 26 may be positioned anywhere along passageway 14 so that the bulk materials may dispense directly into transport vehicle 22. Loading spout 36 is disposed in dispensing aperture 26 such that it is positioned to load the bulk materials directly into transport vehicle 22.

In one embodiment truck and/or rail weights or scales 24 are disposed within passageway 14 which assist in loading transport vehicle 22 with the bulk material. The weights or scales 24 are preferably positioned directly below hopper assembly 30 so that the weight of the bulk material is measured as transport vehicle 22 is being loaded.

As discussed above, when dispensing the bulk material, hopper assembly 30 is disposed directly over passageway 14 such that any bulk material above hopper assembly 30 will gravitate into surge bin 32. Because hopper assembly 30 is positioned well above floor 16 of storage structure 12, additional mechanical means are required to fully empty storage structure 12. Accordingly, in one embodiment of the present invention, as the bulk material becomes lower than hopper assembly 30 means are provided for transferring the bulk material from within chamber 17 but outside of surge bin 32 to within surge bin 32. By way of example and not by limitation, depicted in FIG. 1 is one embodiment of a recirculating system 38 that may be appropriate for fine powders. The type of recirculating system appropriate for each system will depend largely on the bulk material being stored.

Recirculating system 38 comprises a pneumatic transfer pod 40 positioned on each side of hopper assembly 30. Transfer pods 40 are disposed below floor 16 of storage structure 12. Recirculating apertures 42 are formed in floor 16 to convey bulk material from the bottom of storage structure 12 to transfer pods 40. Transfer pods 40 then fluidize the bulk material and convey it through transfer lines 44 to the top of hopper assembly 30. As such, substantially all of the bulk material below hopper assembly 30 may be dispensed out through hopper assembly 30. In this embodiment, floor 16 of storage structure 12 may be somewhat sloped to assist the bulk material in flowing toward transfer pods 40.

Figure 3:
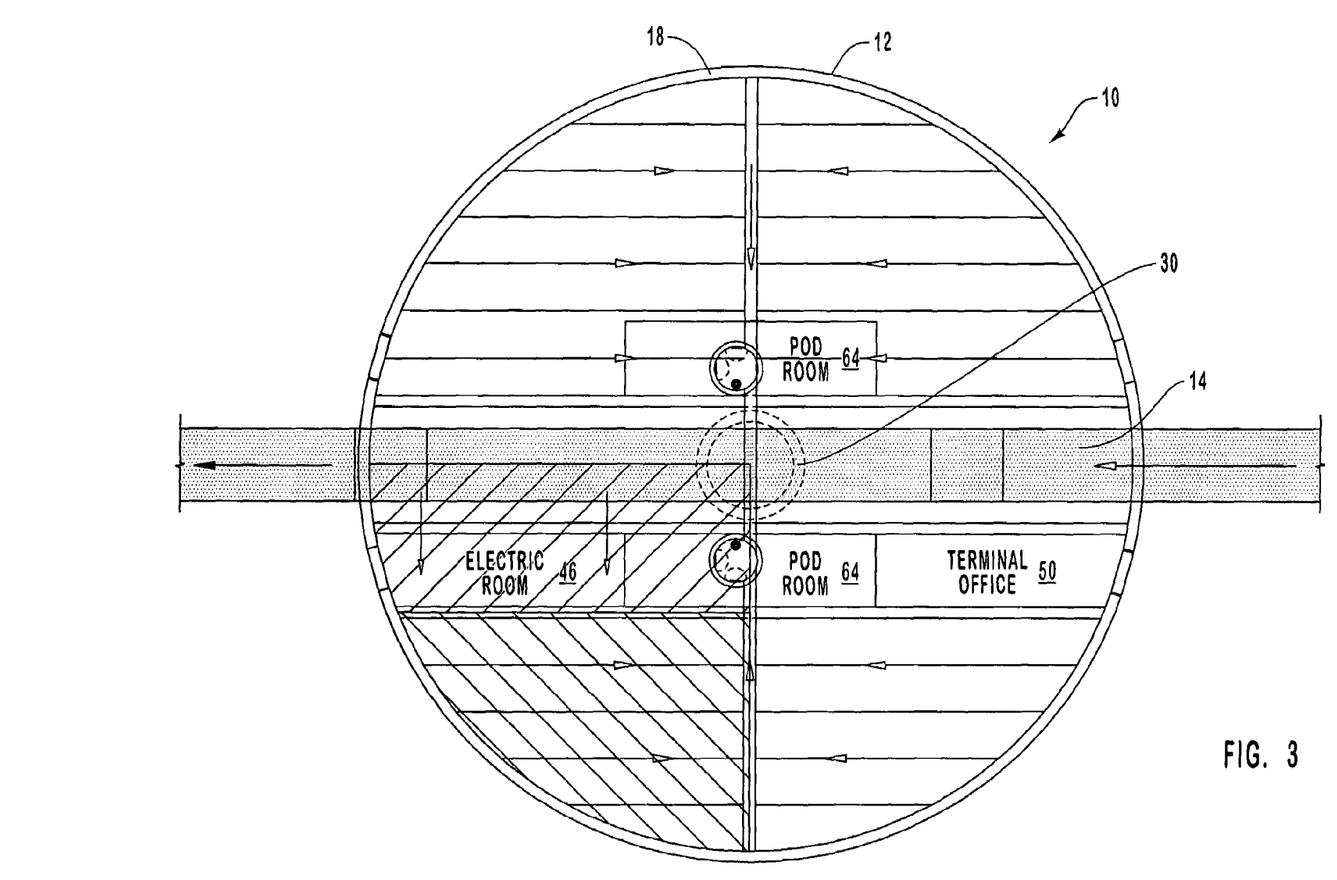
FIG. 3 illustrates a top cross-sectional view of the embodiment of FIG. 1.

Referring to FIG. 3, where recirculating system 38 is implemented with hopper assembly 30, storage structure 12 is configured to accommodate the machinery and other equipment. Specifically, passageway 14 is formed substantially centrally within storage structure 12. Hopper assembly 30 is formed directly over passageway 14. Transfer pods 40 are placed on each side of hopper assembly 30. Each transfer pod 40 is responsible for emptying that particular half of storage structure 12 as shown by the direction of the arrows. Work spaces may be provided in storage structure 12 to accommodate the mechanical system for hopper assembly 30 and/or recirculating system 38. For example, an electric room 46 and a pod rooms 64 are constructed on the sides of passageway 14 so that the mechanics of hopper assembly 30 and recirculating system 38 may be easily accessed. In addition other work space, such as office space 50 may be constructed in storage structure 12.

It will be appreciated that additional structural features may be provided with the transfer terminals of the present invention. Such structural features may include ramps, floorings, stairs, and the like to access different parts of hopper assembly 30 or recirculating system 38.

Figure 4:
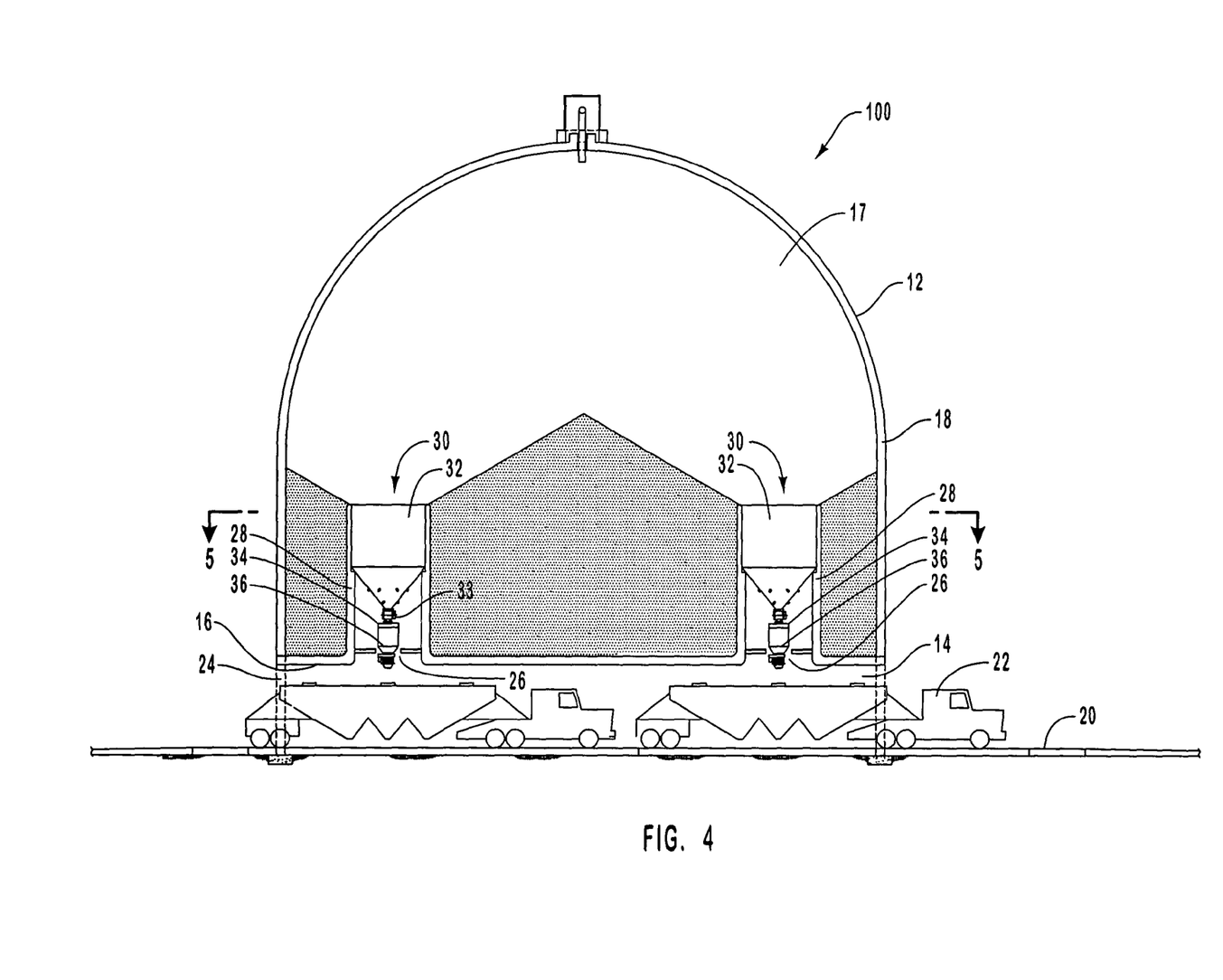
FIG. 4 illustrates a side cross-sectional view of another embodiment of a storage structure of the present invention.

FIG. 4 depicts an embodiment of a transfer terminal 100 similar to the embodiment of FIG. 1. In each of the following embodiments, like elements are referred to with like reference numbers. As shown in FIG. 4, multiple hopper assemblies 30 are positioned above corresponding multiple dispensing apertures 26. In FIG. 4, passageway 14 is configured to receive two transport vehicles 22 to provide for more efficient loading of bulk material. The placement of hopper assemblies 30 depends on the particular design considerations for transfer terminal 100. However, FIG. 4 serves to illustrate that multiple hopper assemblies 30 may be employed.

Figure 5:
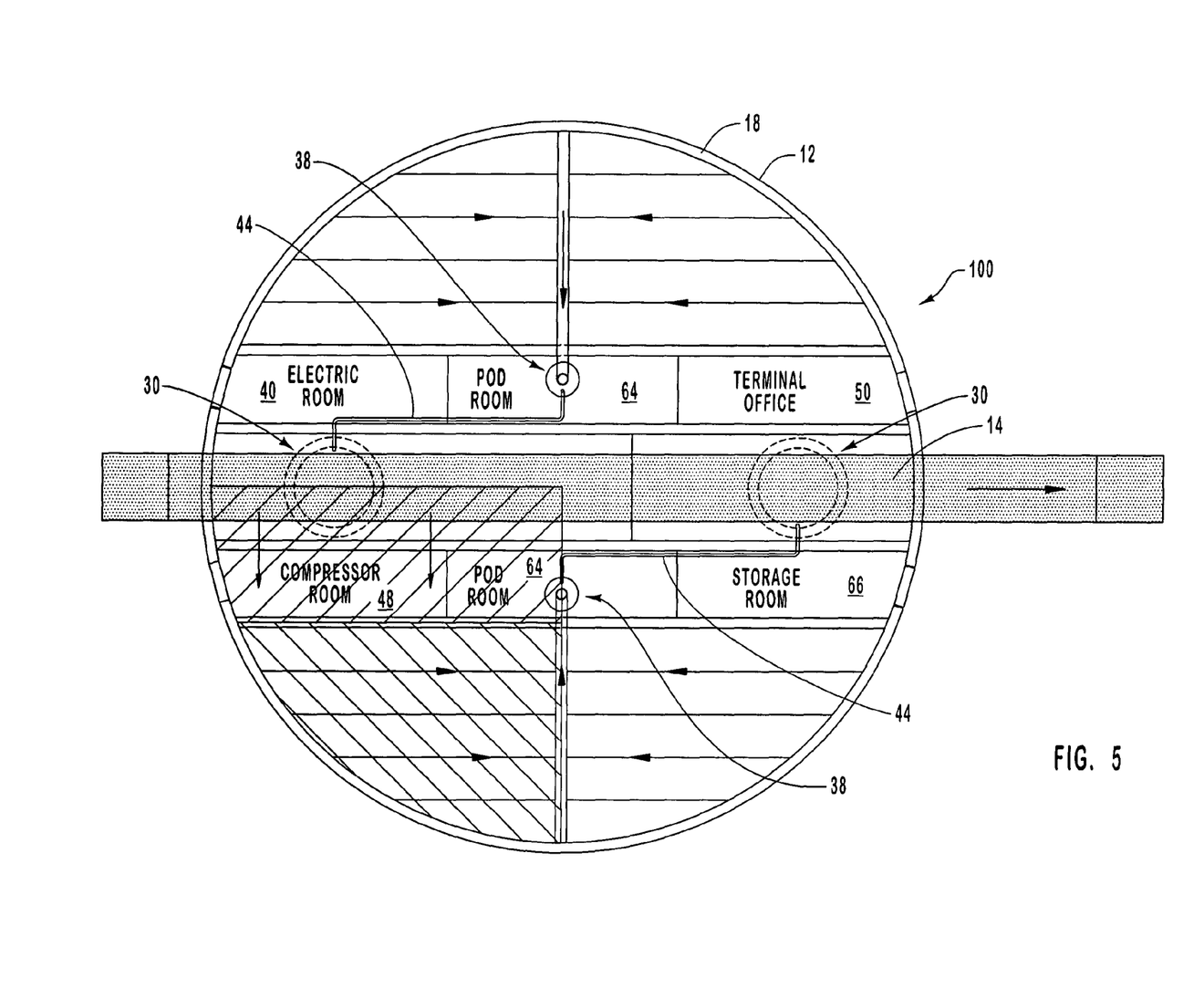
FIG. 5 illustrates a top cross-sectional view of the embodiment of FIG. 4.

FIG. 5 depicts the workspaces that may be constructed where two hopper assemblies 30 are used in conjunction with recirculating system 38 of FIG. 1. Recirculating system 38 comprises two transfer pods 40 positioned centrally in storage structure 12 on either side of passageway 14. Transfer pods 40 operate in substantially the same fashion as in the embodiment of FIG. 1, however, transfer lines 44 are positioned such that each transfer line flows into a different hopper assembly 30. As such, each transport vehicle 22 is loaded with bulk material located below hopper assemblies 30. FIG.

5 also shows workspaces constructed for each hopper such as an electric room 40, compressor room 48, pod rooms 64, terminal office 50 and storage room 66.

Figure 6:
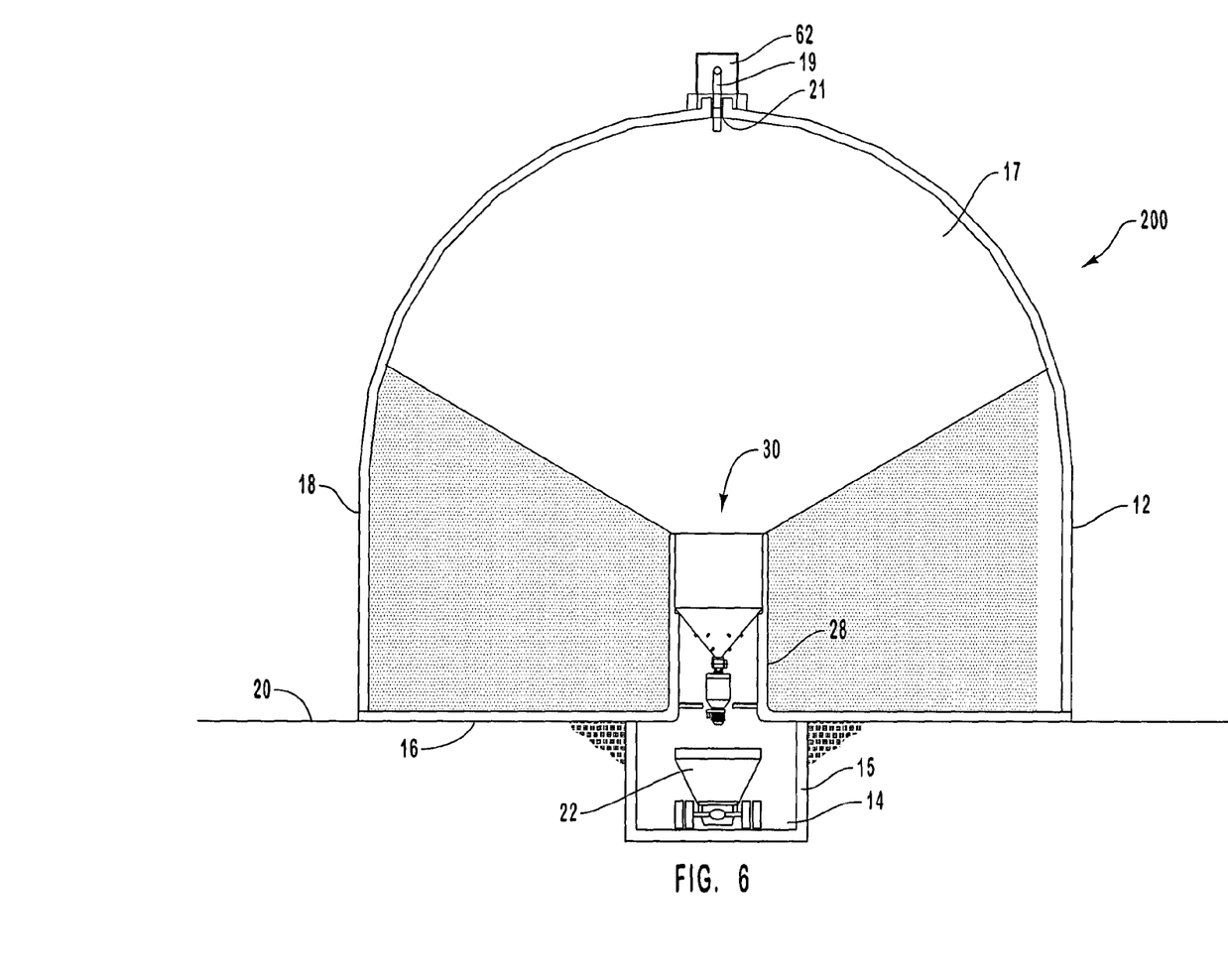
FIG. 6 illustrates a front cross-sectional view of another embodiment of a storage structure of the present invention.

It is appreciated that passageway 14 may be constructed in a variety of ways. Turning now to FIG. 6, a transfer terminal 200 is shown having an alternative embodiment for passageway 14. As illustrated in FIG. 6, floor 16 of storage structure 12 is constructed substantially flush with ground 20. Passageway 14 is formed having a tunnel-like construction underneath storage structure 12. As discussed above, passageway 14 is formed to allow sufficient clearance for a large transport vehicle 22.

In another embodiment of passageway 14, not shown, dome shaped storage structure 12 may be elevated above ground 20 by pillars or some other foundation. In this embodiment, passageway 14 may not have a tunnel configuration but simply be the space underneath dome shaped storage structure 12.

In some embodiments, passageway 14 may extend only partially through storage structure 12, although this embodiment is less preferred because it requires the transport vehicle 22 to back out of storage structure 12. The width of passageway 14 may vary from extending the entire width of storage structure 12 to sufficient width to allow clearance for transport vehicle 22.

Figure 7:
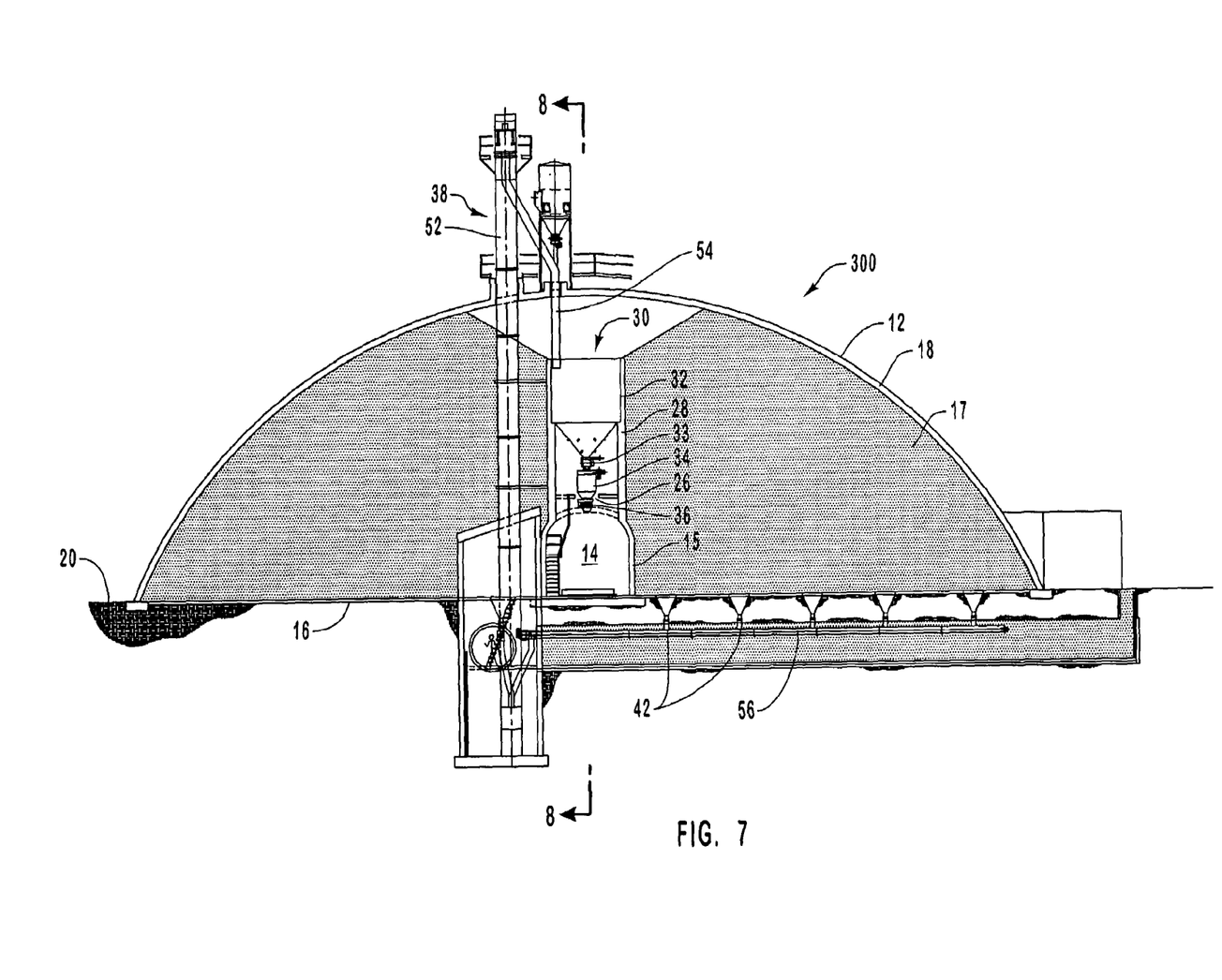
FIG. 7 illustrates a front cross-sectional view of yet another embodiment of a storage structure of the present invention.
Figure 8:
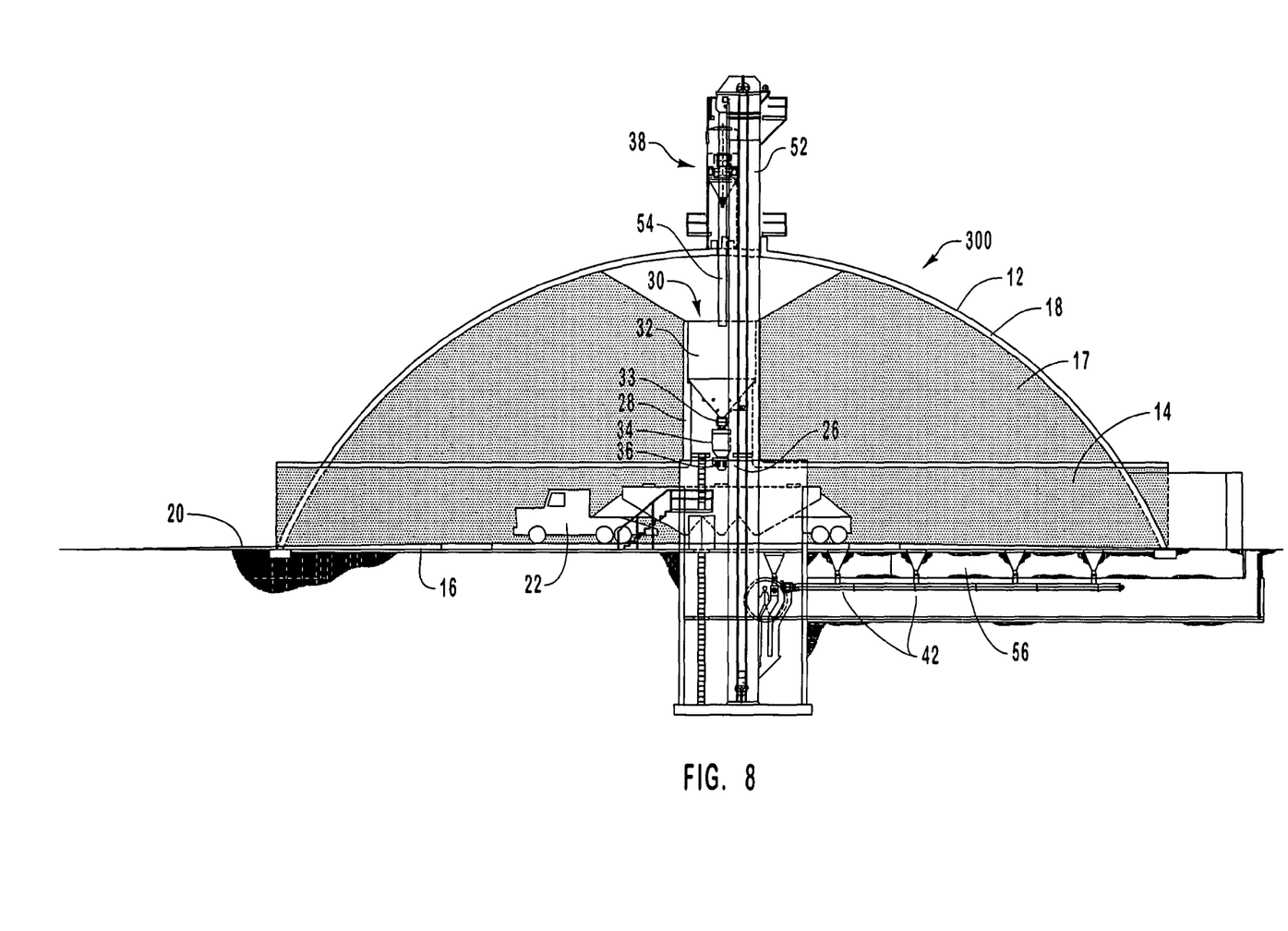
FIG. 8 illustrates a side cross-sectional view of the embodiment of FIG. 7.
Figure 9:
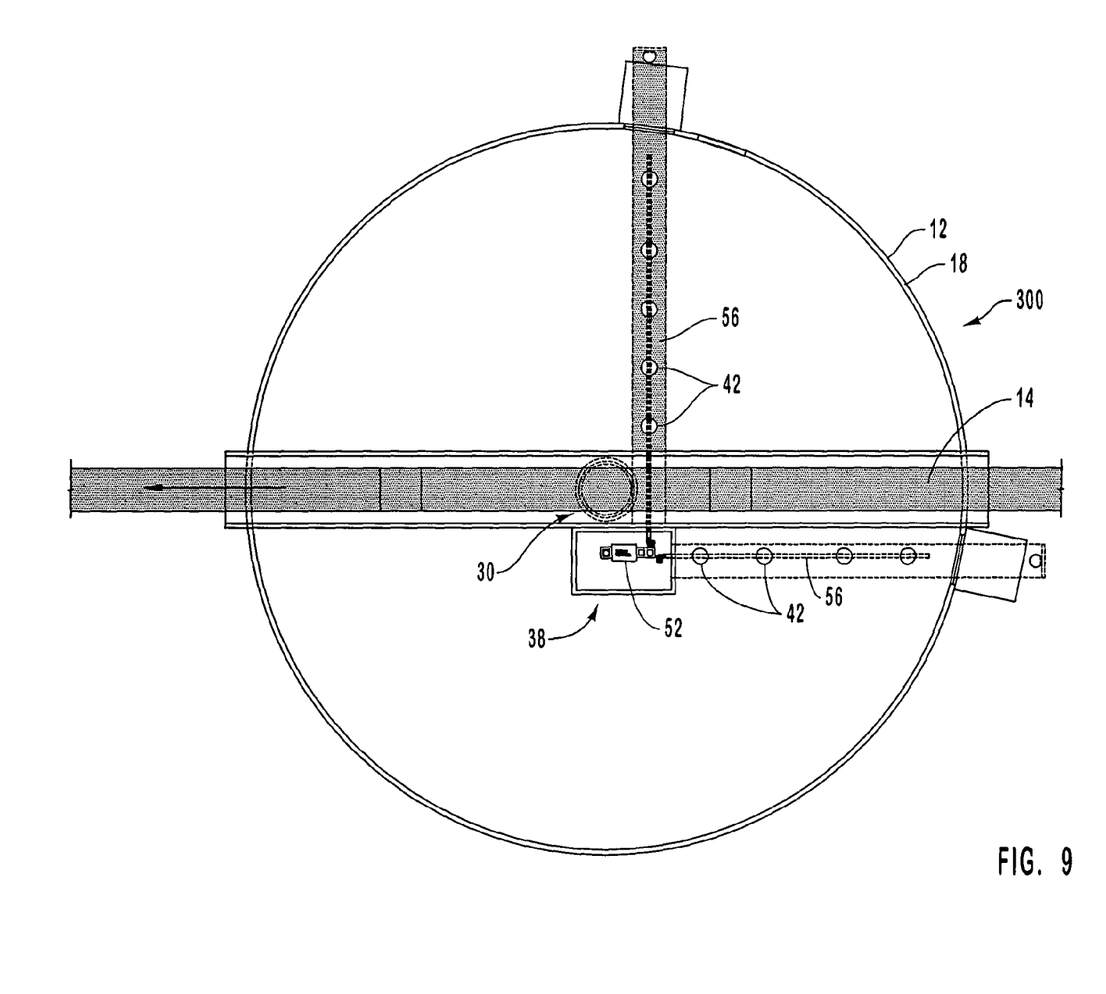
FIG. 9 illustrates a top cross-sectional view of the embodiment of FIG. 7.

Recirculating system 38 may comprise various structures depending on the type of bulk material being stored in storage structure 12. Referring now to FIGS. 7-9, a transfer terminal 300 is depicted, wherein recirculating system 38 comprises a bucket elevator 52. In the embodiment of FIGS. 7-9, bucket elevator 52 is placed inside storage structure 12. Bucket elevator 52 has an outlet line 54 placed in communication with surge bin 32 of hopper assembly 30. It is appreciated that when a bucket elevator is used, additional space will need to be constructed or excavated under storage structure 12.

A series of recirculating apertures 42 are formed on floor 16 of storage structure 12. The recirculating apertures 42 are disposed above a conveyor 56 which in turn is placed underneath floor 16 of storage structure 12. Conveyor 56 extends from wall 18 of storage structure 12 to the bottom of bucket elevator 52. As such, the bulk material is efficiently conveyed through recirculating apertures 42 onto conveyor 56. Conveyor 56 then moves the bulk material to bucket elevator 52 which in turn dispenses the bulk material to hopper assembly 30 to be loaded in transport vehicle 22. As shown in FIG. 9, a pair of conveyors 56 may be positioned on each side of storage structure 12, each conveying material to bucket elevator 52.

When loading transport vehicles 22, hopper assembly 30 feeds material naturally from the top of the dome until the level of bulk material falls to the upper portion of hopper assembly 30. When the bulk material is located lower than hopper assembly 30, conveyors 56 are used to draw bulk material down through the floor 16 of storage structure 12 and convey the bulk material to bucket elevator 52 which charges hopper assembly 30. It is appreciated that bucket elevator 52 may be configured to initially fill storage structure 12 with bulk material. In another embodiment, not shown, bucket elevator 52 may be configured to be positioned externally of storage structure 12 so that additional excavation construction costs may be avoided.

Figure 10:
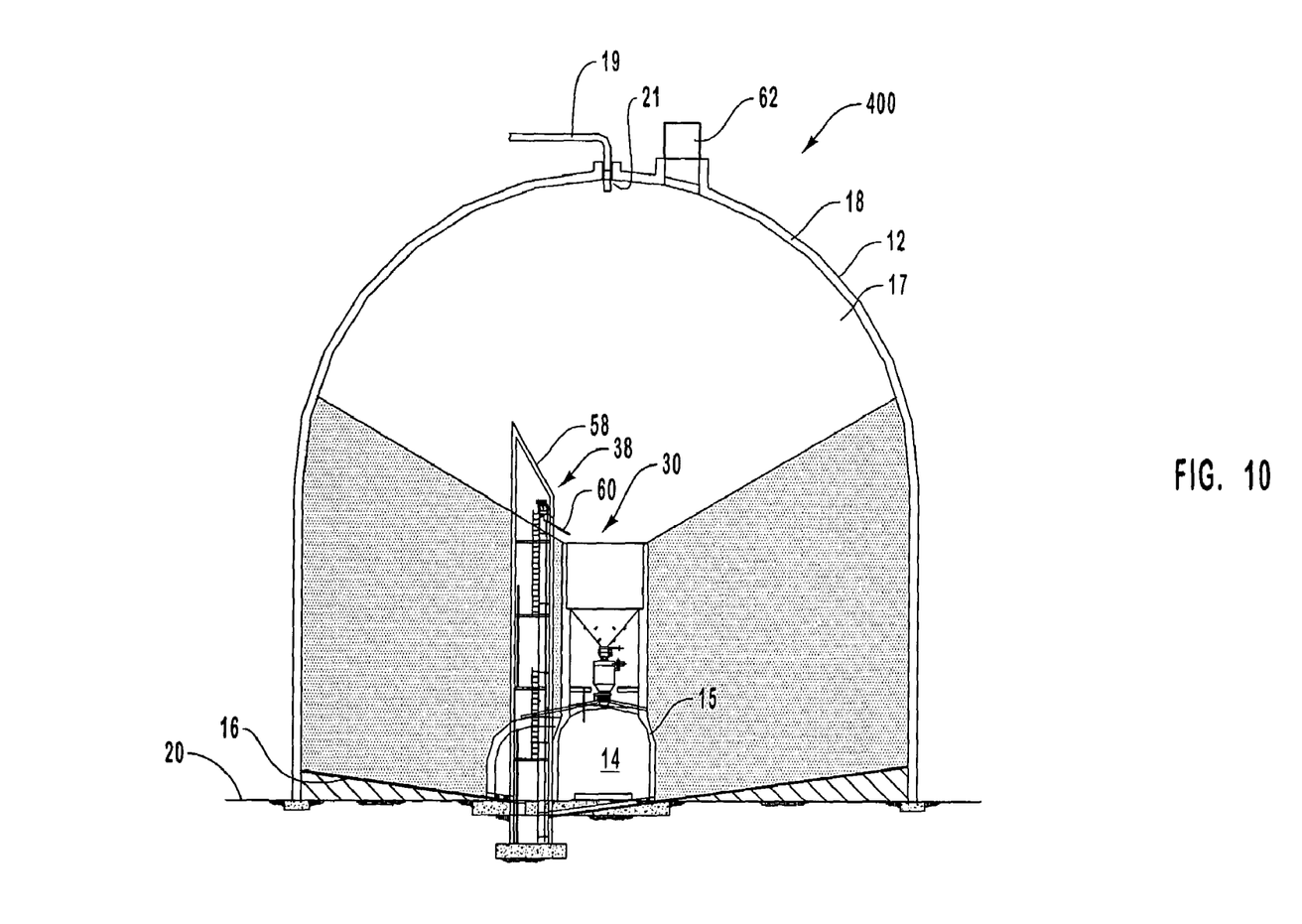
FIG. 10 illustrates a front cross-sectional view of another embodiment of storage structure of the present invention.

Referring now to FIG. 10, a transfer terminal 400 is shown having a recirculating system 38 in the form of a vertical auger 58. Vertical auger 58 is positioned next to hopper assembly 30 and has an outlet spout 60 at the top thereof for dispensing bulk material into hopper assembly 30. Vertical auger 58 may be appropriate for powder bulk materials, granulated materials and pellet materials. As also shown in FIG. 10, a dust collector 62 is placed on wall 28 of storage structure 12 to collect dust from the bulk materials.

The transfer pods, bucket elevator, and vertical auger recirculation systems are exemplary of the types of structures and systems which are appropriate for means for transferring the bulk material from within chamber 17 but outside of surge bin 32 to within surge bin 32. In other alternative embodiments within the scope of the present means, is appreciated that any number of other mechanical conveying systems can be used for transferring the bulk material to surge bin 32. For example, compressed air/venturi systems, air-lift systems, combination mechanical screw and compressed air pumps, and other combinations or systems known to those skilled in the art can be used. It will be appreciated that the type of recirculation system will depend on the type of material stored in storage structure 12.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A transfer terminal comprising:
   a storage structure bounding a chamber having a maximum height extending between a floor of the storage structure and a top end of the chamber, the chamber being adapted to receive bulk material;
   a tunnel wall bounding a passageway extending through or below at least a portion of the storage structure;
   a compartment wall upwardly extending from the tunnel wall into the chamber, the compartment wall terminating at a top end face disposed within the chamber, the compartment wall bounding a compartment that is in communication with the passageway of the tunnel;
   a first surge bin at least partially disposed within the compartment bounded by the compartment wall, the first surge bin having an inlet, the inlet and the top end face of the compartment wall both being disposed within the chamber of the storage structure at a location below the top end of the chamber by a distance of at least one-third of the maximum height but above the floor such that when the chamber of the storage structure is filled above the location of the inlet and the top end face of the compartment wall with bulk material, the bulk material freely flows under the force of gravity through the inlet and into the first surge bin;
   an opening formed in the tunnel wall so as to provide communication between the first surge bin and the passageway of the tunnel wall; and
   means for transferring bulk material from within the chamber but outside of the first surge bin to within the compartment of the first surge bin.

2. A transfer terminal as recited in claim 1, wherein the storage structure is a free-standing structure comprising a floor and an exterior boundary wall upstanding therefrom so as to form an enclosed dome, the floor and exterior boundary wall bounding the chamber, the weight of the storage structure being supported only through the external walls bounding the chamber.

3. A transfer terminal as recited in claim 1, wherein the first surge bin is fully disposed within the chamber of the storage structure.

4. A transfer terminal as recited in claim 1, wherein the tunnel wall transversely extends completely across the storage structure.

5. A transfer terminal as recited in claim 1, further comprising a weight scale disposed within or below the passageway.

6. A transfer terminal as recited in claim 1, wherein the passageway is configured to receive a rail car or a truck.

7. A transfer terminal as recited in claim 1, further comprising a flow control valve coupled with the surge bin so as to control the flow of bulk material from the surge bin to the passageway.

8. A transfer terminal as recited in claim 1, wherein the means for transferring bulk material comprises a transfer pod in communication with the first surge bin.

9. A transfer terminal as recited in claim 1, wherein the means for transferring bulk material comprises a bucket elevator at least partially disposed within the chamber of the storage structure.

10. A transfer terminal as recited in claim 9, further comprising a conveyor belt configured to feed bulk material from the chamber of the storage structure to the bucket elevator.

11. A transfer terminal as recited in claim 1, wherein the means for transferring bulk material comprises a vertical auger at least partially disposed within the chamber of the storage structure.

12. A transfer terminal as recited in claim 1, further comprising a second surge bin at least partially disposed within the chamber of the storage structure, the second surge bin being in communication with the passageway.

13. A transfer terminal as recited in claim 1, wherein the chamber of the storage structure has a volume of at least 50,000 cubic meters.

14. A transfer terminal as recited in claim 1, wherein the means for transferring bulk material is configured such that during the transfer of the bulk material from the chamber to the first surge bin the transferred bulk material does not rise above a level in the chamber that is positioned below the top end of the chamber by a distance of at least one-third the maximum height.

15. A transfer terminal as recited in claim 1, wherein the inlet of the first surge bin is continuously open and the surge bin is free of any closure for selectively closing the inlet of the first surge bin.

16. A transfer terminal comprising:
a storage structure comprising a floor and a self-supporting boundary wall upstanding therefrom, the boundary wall having an interior surface that bounds a chamber, the chamber being adapted to receive bulk material;
a tunnel wall bounding a passageway extending through or below at least a portion of the storage structure, the passageway being adapted to receive a transport vehicle;
a compartment wall upwardly extending from the tunnel wall into the chamber, the compartment wall bounding a compartment that is in communication with the passageway of the tunnel;
a first surge bin at least partially disposed within the compartment bounded by the compartment wall, the first surge bin and the compartment wall both being freely spaced apart from the boundary wall so that neither the first surge bin nor the compartment wall support the boundary wall, the first surge bin having an inlet disposed at a location above the floor, the first surge bin being disposed within the chamber of the storage structure such that when the chamber of the storage structure is filled above a predetermined level with bulk material, the bulk material freely flows under the force of gravity through the inlet and into the first surge bin; and
an opening formed in the tunnel wall so as to provide communication between the first surge bin and the passageway.

17. A transfer terminal as recited in claim 16, wherein the tunnel wall transversely extends completely across the storage structure.

18. A transfer terminal as recited in claim 16, further comprising a weight scale disposed within or below the passageway of the tunnel wall.

19. A transfer terminal as recited in claim 16, further comprising a flow control valve coupled with the first surge bin and aligned with the opening formed in the tunnel wall, the flow control valve being operable between an open and closed position for regulating the flow of bulk material out of the first surge bin.

20. A transfer terminal as recited in claim 16, further comprising means for transferring bulk material from within the chamber but outside of the first surge bin to within the compartment of the first surge bin.

21. A transfer terminal as recited in claim 20, wherein the means for transferring bulk material comprises a transfer pod in communication with the first surge bin.

22. A transfer terminal as recited in claim 20, wherein the means for transferring bulk material comprises a bucket elevator.

23. A transfer terminal as recited in claim 22, wherein at least a portion of the bucket elevator is disposed within the storage structure.

24. A transfer terminal as recited in claim 22, further comprising a convey belt configured to feed bulk material from the chamber of the storage structure to the bucket elevator.

25. A transfer terminal as recited in claim 20, wherein the means for transferring bulk material comprises a vertical auger at least partially disposed within the chamber of the storage structure.

26. A transfer terminal as recited in claim 16, wherein at least a portion of the floor slopes toward the tunnel wall on each side of the tunnel wall.

27. A transfer terminal as recited in claim 16, further comprising a second surge bin at least partially disposed within the chamber of the storage structure, the second surge bin being in communication with the passageway of the tunnel wall.

28. A transfer terminal as recited in claim 16, wherein the chamber of the storage structure has a volume of at least 1,000 cubic meters.

29. A transfer terminal as recited in claim 16, a fill line extending through the storage structure at a location vertically above and vertically aligned with the first surge bin so that bulk material passing through the fill line falls directly into the first surge bin through the inlet thereof.

30. A transfer terminal as recited in claim 16, wherein the inlet of the first surge bin is continuously open and the surge bin is free of any closure for selectively closing the inlet of the first surge bin.

31. A transfer terminal as recited in claim 30, further comprising a flow control valve coupled with first surge bin and aligned with the opening formed in the tunnel wall, the flow control valve being operable between an open and closed position for regulating the flow of bulk material out of the first surge bin.

32. A transfer terminal as recited in claim 16, wherein the storage structure is free of any structural supports extending within the chamber between the floor and the boundary wall.

33. A transfer terminal as recited in claim 16, wherein the storage structure is free of any structural supports extending within the chamber between the first surge bin and the boundary wall.

34. A transfer terminal as recited in claim 16, wherein the tunnel is adapted to receive a truck.

35. A transfer terminal as recited in claim 16, wherein the first surge bin is frilly disposed within the compartment bounded by the compartment wall.

36. A transfer terminal as recited in claim 16, further comprising means for transferring bulk material to the first surge bin from within the chamber but outside of the compartment.

\* \* \* \* \*